Sept. 21, 1965 W. O. BECHMAN 3,207,232
PITCH ADJUSTING MECHANISM FOR ROOT PLOWS
Filed May 29, 1961 3 Sheets-Sheet 1
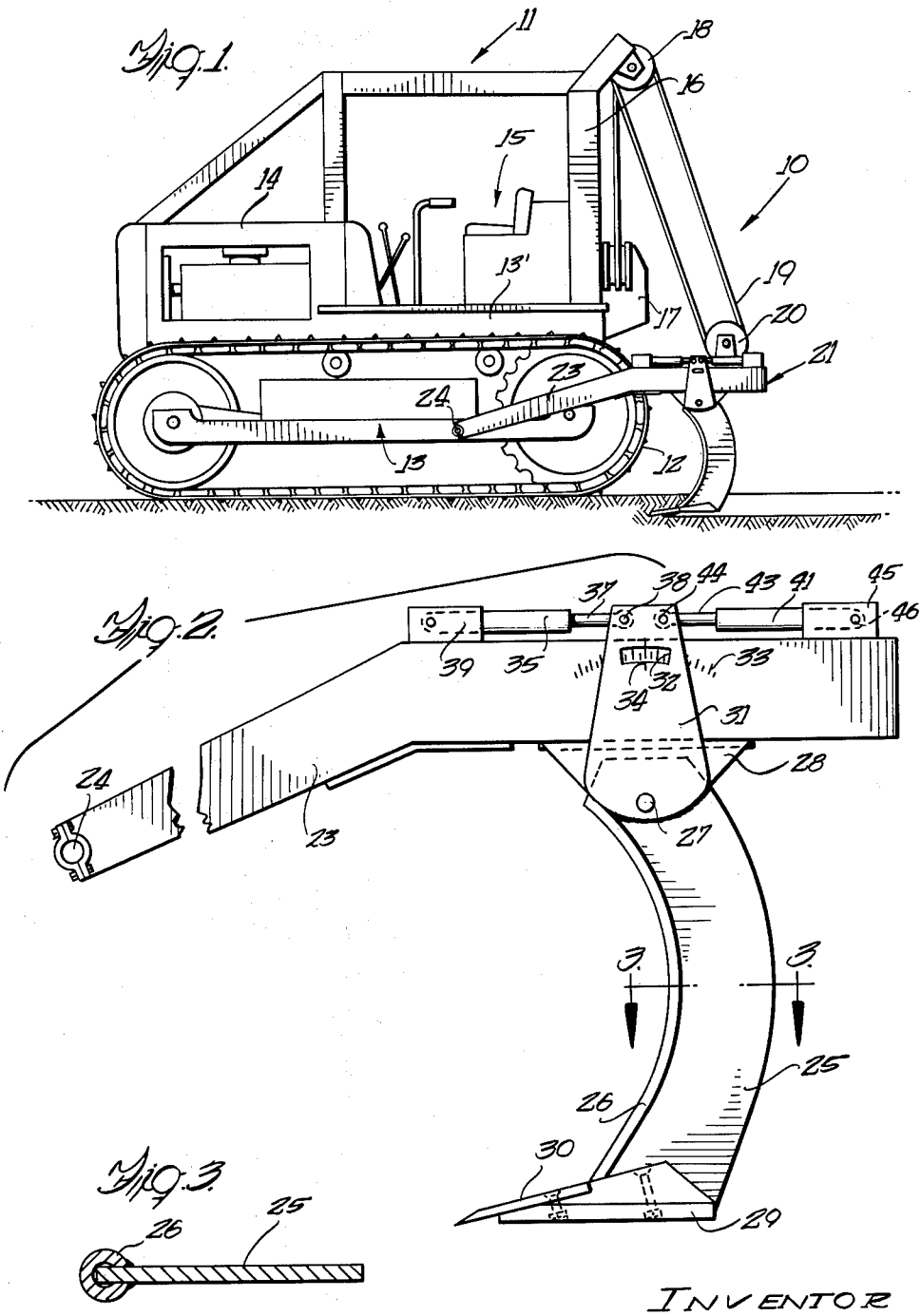
INVENTOR
WILLIAM O. BECKMAN
Paul O. Pippel.
ATTORNEY Sept. 21, 1965 W. O. BECHMAN 3,207,232
PITCH ADJUSTING MECHANISM FOR ROOT PLOWS
Filed May 29, 1961 3 Sheets-Sheet 2
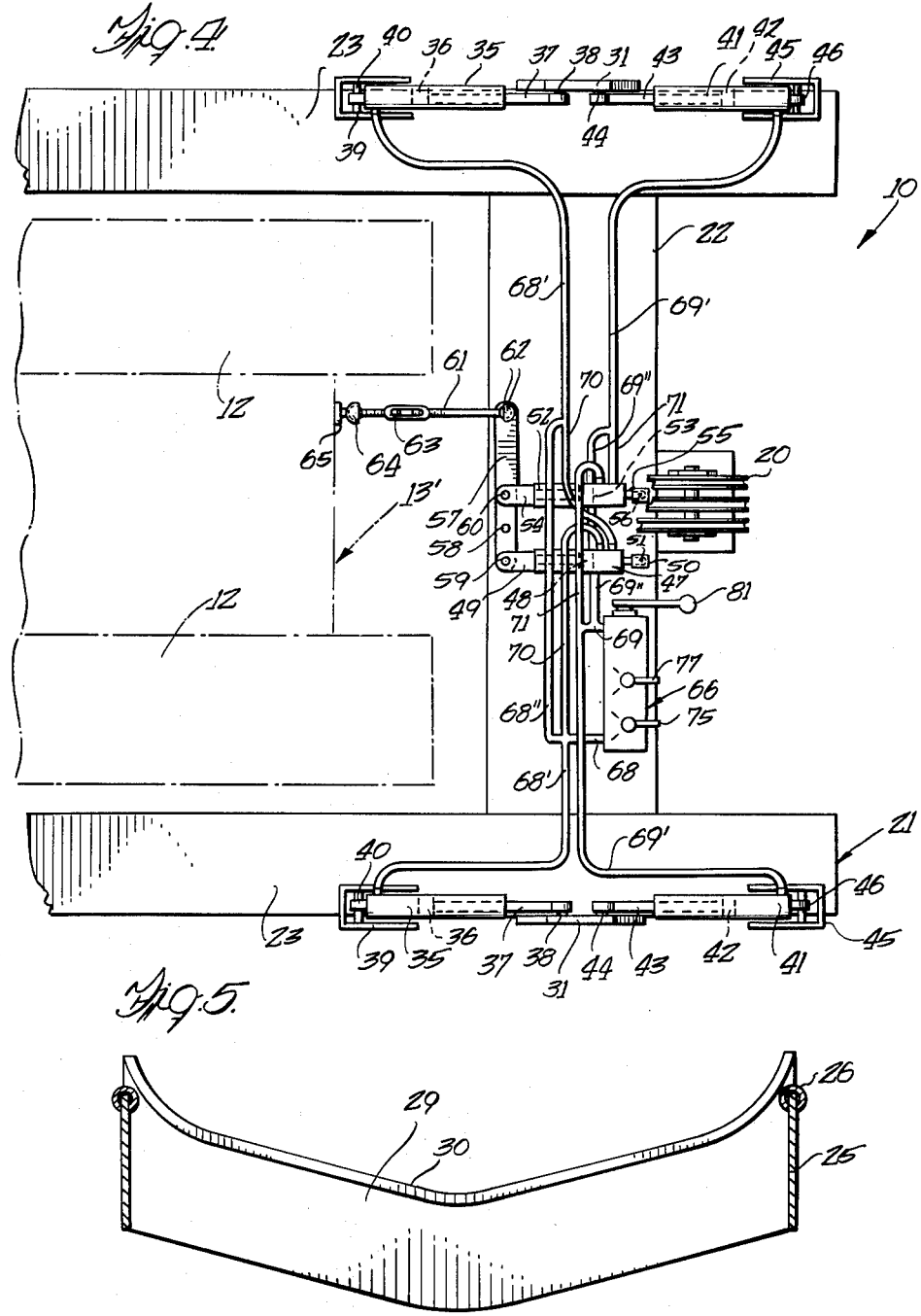
INVENTOR
WILLIAM O. BECHMAN
Paul O. Pippel
ATTORNEY

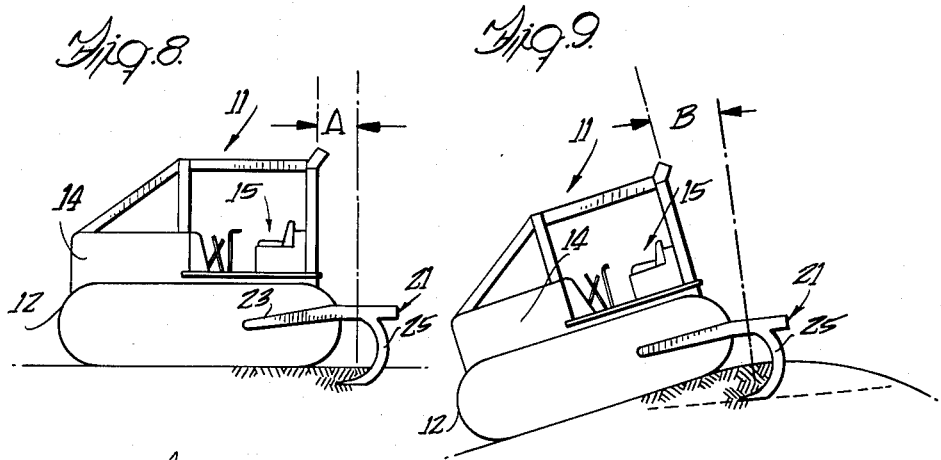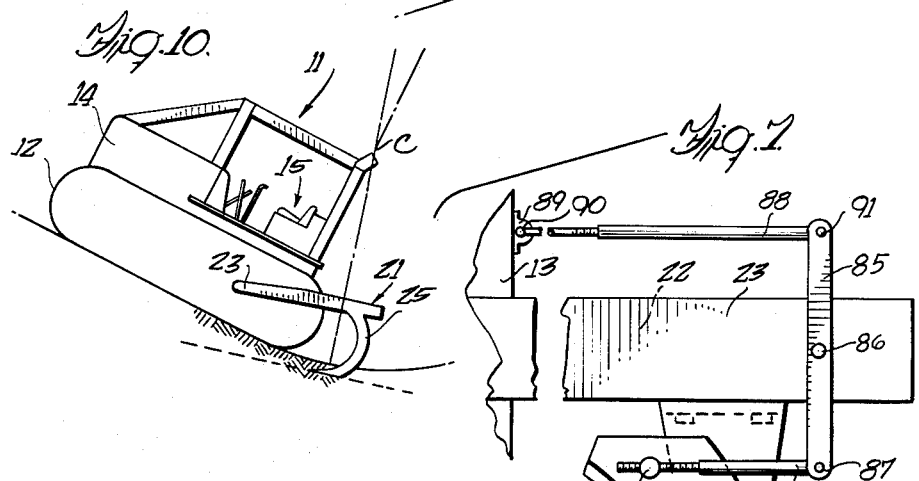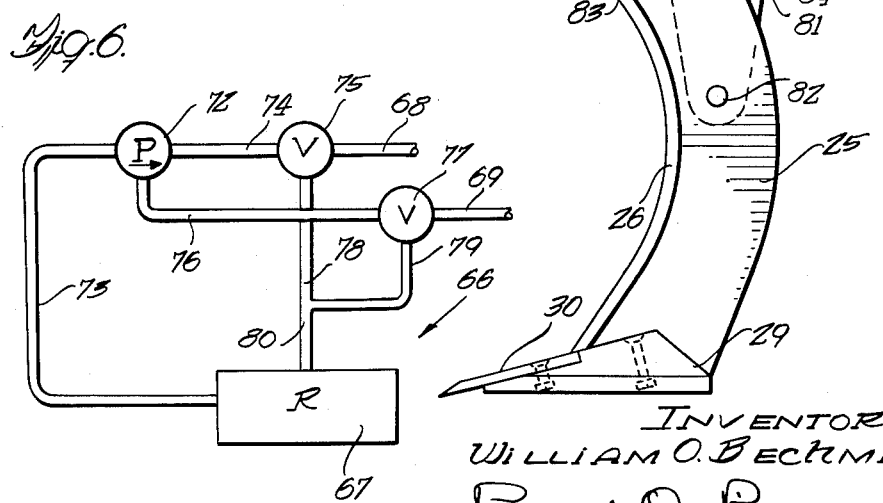

United States Patent Office 3,207,232
Patented Sept. 21, 1965

3,207,232
PITCH ADJUSTING MECHANISM FOR
ROOT PLOWS
William O. Bechman, Chicago, Ill., assignor to International Harvester Company, Chicago, Ill., a corporation of New Jersey
Filed May 29, 1961, Ser. No. 113,371
1 Claim. (Cl. 172—239)

This invention relates to a land-clearing implement of a type generally known as a root plow.

The present invention is an improvement over the construction shown in my patent application Serial No. 843,433, filed September 30, 1959, now issued Patent Number 3,022,836. The present type of land-clearing implement, commonly known as a root plow, is conventionally utilized in areas where the land is infested with undesirable vegetation having deep root growth. In order to clear such land for satisfactory agricultural use it is necessary to sever the roots of the undesirable vegetation at a certain depth below the ground. The type of root plow which has been particularly effective in destroying such root growth comprises a frame consisting of a transverse beam having forwardly extending draft arms which are connected to a tractor. The tractor generally includes a raising and lowering mechanism which is utilized for placing the root plow in an operative position. The transverse beam of the plow generally has connected thereto upwardly extending standards which may be suitably pivoted to a number of different angular positions relative to the beam. The lower ends of the standards are usually connected to a suitable cutting blade of V-shape construction. In order to determine the depth at which the blade will function it is necessary to pivot the standards angularly so that the blade is pitched or tilted accordingly and the degree and type of pitch or tilt will determine the operating depth of the blade. In conventional plows various different pitching or tilting devices have been utilized and such devices are usually utilized to preset the angle of tilt or pitch which is to be utilized. Such a tilt or pitch is usually adequate for operating in level areas since no further adjustment need be made once the operation has started. However, this type of arrangement for setting the blade at a certain pitch is not adequate where the land is of a rolling contour and small hills and depressions are found in the ground. By presetting the degree of tilt of the blade, the blade therefore may dig too deeply on the crest of a hill and when in a valley may dig in a much too shallow manner, thus resulting in a defective vegetation destroying operation. Therefore it is a prime object of this invention to provide an improved root plow construction which includes a compensating mechanism for automatically adjusting the tilt or pitch of the root plow blade as it encounters hills and valleys in an area having a rolling contour.

A still further object is to provide an improved root plow including a fluid extensible motor arrangement adapted to set a root plow in a certain tilt or pitch position, the said mechanism also having an automatic compensating device for altering the pitch or tilt as the plow encounters rolling type of ground contour.

Still another object is the provision of a root plow for severing root life beneath the ground, the said implement including fluid extensible members which are connected to tilt the root plow blade in response to the relative position of the tractor frame and the implement when the said implement and tractor encounter valleys and hills during operation.

Still a more specific object of the invention is to provide an improved root plow including a transverse cutting blade adapted to be disposed below the soil, the said blade being connected to upright standards which are pivotally connected to the implement frame so that the pitch or tilt of the blade may be varied, the said variance resulting from an automatic compensating device comprising hydraulic extensible devices which move the plow standards in response to any change in the angularity between the root plow implement frame and the frame of the tractor to which the implement is attached.

These and other objects will become more readily apparent from a reading of the description when examined in connection with the accompanying sheets of drawings.

In the drawings:

FIG. 1 is a side elevational view of a crawler type tractor having an improved root plow implement connected thereto showing the implement disposed in operating relation below the ground;

FIG. 2 is an enlarged side elevational view of the improved root plow shown in FIG. 1;

FIG. 3 is a detail view of an upright support or plow standard taken substantially along the line 3—3 of FIG. 2;

FIG. 4 is an enlarged plan view of an improved root plow showing a portion of the frame structure thereof and also disclosing schematically its connection to the rear of a crawler type tractor;

FIG. 5 is a plan view, partially in section, of an improved root plow cutting blade;

FIG. 6 is a diagrammatic view showing operating portions of a hydraulic system for adjusting the pitch or tilt of a root plow;

FIG. 7 is a side elevational view, similar to FIG. 2, showing a modified construction for automatically adjusting the pitch of a root plow blade;

FIG. 8 is a schematic view showing a crawler tractor and root plow in operative relation on a level portion of ground;

FIG. 9 is a schematic view of a crawler tractor and root plow of conventional construction showing the greater depth or scalping action of the plow on a rise or hill in the ground; and FIG. 10 is a view similar to FIG. 9, however, showing the operative relation of the root plow as the crawler tractor crawls on an incline with the plow operating in a shallow valley.

Referring now particularly to FIGS. 1, 2 and 4, a root plow is generally designated by the reference character 10. The root plow 10 is shown connected to a crawler type tractor generally designated at 11. The tractor 11 comprises a crawler track structure 12, a track frame 13 and a tractor frame 13'. A power unit 14 is supported on the frame 13' in proximity to an operator's station 15. A superstructure 16 supports a winch 17 which in effect is a raising and lowering mechanism. The superstructure 16 also includes a plurality of sheaves 18 about which a cable 19 is wound, the said cable also being wound around sheaves 20 suitably supported on a U-shaped frame 21. The winch 17 is connected to the cable 19 for raising and lowering the U-shaped frame 21.

The U-shaped frame 21 comprises a transversely extending supporting beam 22, having at laterally spaced opposite ends thereof, longitudinally extending draft arms 23 which are pivotally connected, as indicated at 24, to the sides of the frame 13. A pair of laterally spaced vertically extending blades, standards, or plow supports 25 include, as shown in FIGS. 3 and 5, slotted tubes 26 connected to the supports 25 at their forward or leading edges, thus providing rounded leading edges.

As best shown in FIG. 2, the plow supports 25 are pivoted as indicated at 27 on brackets 28 connected to the underneath side of the draft arms 23. A U-shaped cutting blade or member 29 is suitably supported on the lower ends of the plow supports 25. The cutting member 29 has a forward U-shaped cutting edge 30. Each standard includes an upwardly extending arm 31 which is rigidly connected to each standard, one of said arms having a slot 32 through which the operator may observe calibrations or markings 33 on one of the draft arms 23. An indicating line 34 also is provided on one of the arms 31.

Each of the supports or standards 25 may be pivoted by means of fluid jacks, fluid motors or, as otherwise known, fluid extensible devices. The first of a pair of fluid jacks is designated at 35 and as indicated in FIG. 4, the first pair of said jacks 35 are disposed forwardly of the arms 31. Each of the jacks 35 includes a piston 36 connected to a piston rod 37, the said rods being pivotally connected as indicated at 38 to the upper ends of the arms 31. The fluid jacks 35 are also pivotally connected on brackets 39 as indicated at 40, the said brackets 39 being suitably secured to the draft arms 23.

A second pair of fluid jacks are designated by the numeral 41, and these are disposed rearwardly of the arms 31 as shown in FIG. 4. The fluid jacks 41 include pistons 42 connected to piston rods 43 pivotally connected to the arms 31 as indicated at 44. The fluid jacks 41 are pivotally connected as indicated at 46 to brackets 45 suitably supported on the draft arms 23.

Referring now particularly to FIG. 4, a third fluid jack or motor is designated at 47 and includes a piston 48 and piston rod 49. The fluid jack 47 is pivotally supported on the transverse beam 22 by means of a bracket 50 and pivotal connection 51. A fourth fluid jack or motor 52 spaced laterally with respect to the jack 47 includes a piston 53 and rod 54, the said jack 52 being pivotally connected to a bracket 55 supported on the beam 22 and the said jack 52 being pivoted as indicated at 56.

A compensating device includes a lever arm 57 extending transversely with the transverse beam 22. The lever arm 57 is pivoted to the beam 22 by means of a pivot connection 58, one end of the lever arm 57 being pivoted to the rod 49, as indicated at 59. The lever 57 is also pivotally connected on an opposite side of the pivot 58 to the rod 54 as indicated at 60. The lever 57 also includes an extension to which an adjustable link 61 is pivotally connected by means of a ball and socket connection 62, the said adjustable link 61 having a suitable turnbuckle adjusting means 63 and being pivotally connected by means of a ball 64 to a socket bracket 65 projecting from the tractor frame 13'.

A fluid pressure source is generally designated in FIGS. 4 and 6 by the reference character 66. The pressure source 66 includes a suitable reservoir 67, shown in FIG. 6. From the pressure source 66 a first conduit 68 extends outwardly for communication with a conduit line 68' which communicates with the fluid jack 35 on the lefthand side of the implement. The conduit 68 also communicates with a conduit 68'' which in turn communicates with a conduit 68' extending to the fluid jack 35 disposed on the righthand side of the implement. A second conduit 69 extends outwardly from the source of pressure 66, the said conduit 69 communicating with a conduit line 69' extending to the second cylinder 41 disposed on the lefthand side of the implement. The conduit 69 also communicates with a conduit line 69'' communicating with a conduit line 69' extending for communication with the second fluid jack 41 disposed on the righthand side of the implement. As shown again in FIG. 4, third conduits 70 communicate with the third fluid jack 47, the said conduits 70 communicating with the lines 68'. Fourth conduits 71 extend from the fourth fluid jack 52 for communication with the conduit lines 69' which extend to the jacks 41.

The fluid pressure source shown in FIG. 4 may be conventional and FIG. 6 shows a schematic view of the arrangement wherein the reservoir is designated at 67. A pump is designated at 72, the said pump being in communication with the reservoir 67 by means of a pressure line 73. A conduit 74 extends from the pump 72 to a valve 75 which is adapted to be opened to permit fluid under pressure to be directed to the conduit 68. Likewise a conduit 76 extends to a valve 77 to permit fluid under pressure to be directed into the conduit 69. The valves 75 and 77 may also be moved to return fluid from the lines 68 and 69 to return lines 78 and 79 communicating with a conduit 80 which in turn communicates with the reservoir 67. Each of the valves 75 and 77 may also be regulated to a closed position wherein fluid in the conduits 68 and 69 is locked from the pumps 72 and from the reservoir 67. The fluid pressure device 66 may include a hand actuated member 81 whereby the operator may actuate the pump 72 manually. Or the pump 72 may be suitably operated by means from the tractor, the mode of operation of the pump not being pertinent to the present invention.

The modification shown in FIG. 7 utilizes the standards 25, leading edges 26, blade 29 and cutting edges 30 and is similar in most respects with the preferred embodiment shown in FIGS. 1 through 4. However, in the device shown in FIG. 7, the tilt or adjustment of the standards 25 and blade 30 is effected by mechanical linkage means rather than the fluid jack type of arrangement above described. The standards 25, as shown in FIG. 7, are pivotally connected to brackets 81 projecting downwardly from the transverse member 22, the said pivotal connection being indicated at 82. A rotatable threaded pin 83 is pivotally connected to the standard 25 and adjustably supports at one end an adjustable arm 84. Levers 85 are pivotally connected on opposite sides of the draft arms as indicated at 86. The lower end of the lever 85 is pivotally connected to the adjustable arm 84 as indicated at 87. An adjustable link or arm 88 is pivotally connected to a bracket 89 supported on the rear of the tractor frame 13' by means of a pivot connection 90. The opposite end of the arm 88 is pivotally connected to the lever 85 by means of a pivot 91.

The operation

As indicated previously, the conventional type of root plow includes various mechanisms for setting the tilt or pitch of the plow blade in such a manner that a certain depth adjustment or operating depth is assured. Such an adjustment in the conventional plow is a set adjustment and is satisfactory for level land since the plow will remain at the cutting depth desired. In FIGS. 8, 9 and 10 the effect of such a set tilt is shown. On level ground, as shown in FIG. 8, the blade is shown to be disposed at a certain depth within the ground and the distance between the tractor frame and implement frame is designated by the letter A. In FIG. 9 the implement is shown in position as the tractor has just passed the peak of a hill or ridge and it is of course obvious that in the conventional plow a much greater digging depth occurs in view of the angular position of the implement frame relative to the tractor frame. The distance between the two frames is designated at B and it is obvious that this distance is much greater than the distance A so that the plow is scalping or digging to an undesirable depth. FIG. 10 discloses what occurs when the root plow is digging within a hollow, ravine or valley. In this connection the angularity of the implement frame relative to the tractor frame is such that the distance between the two has intersected at lines C so that now there is little distance between the tractor frame and implement frame and the plow is almost out of the ground and a much too shallow root cutting operation takes place. By the present improved construction the pitch or tilt of the cutting blade is automatically compensated for or adjusted when valleys or ridges are encountered so that the depth will be constantly maintained despite the contour of the ground.

In the operation of the improved construction the operator determines the type of setting he desires with respect to the tilt or pitch of the plow blade and the said depth adjustment can be read from the markings 33.

Supposing for instance, referring to FIG. 2, that a deeper depth is desired, the standards 25 would be moved in a rearward or counterclockwise direction so that the plow blade 30 would be pitched or tilted more in a downward direction with respect to the ground. Thus the digging action would be deeper. To effectuate the rearward or counterclockwise movement of the standards 25, the operator would desire to provide pressure in the line 69 so he would open the valve 75 so that fluid under pressure would flow through the line 76 through the valve 77 to the conduit 69. From the conduit 69 fluid under pressure would flow through the conduit 69' to the rearmost cylinders 41 whereupon the rods 43 would advance outwardly, moving the arms 31 and standards 25 in a counterclockwise direction. Simultaneously the valve 75 would be set so that fluid would return through the conduit 68, conduits 78 and 80 to the reservoir 67. The said return, of course, would be from the cylinders 35 through the lines 68' to the conduit 68. Once the degree of tilt is achieved the operator merely closes both valves 75 and 77 so that fluid is now locked in the system and the pitch of the standards 25 is set.

As the plow is in hilly terrain or contour the compensating device disclosed particularly in FIG. 4 will now be effective. Supposing that the implement is operating near the crest of a hill as the tractor advances downwardly over the crest, as indicated in FIG. 9, the implement frame is in an angular position with respect to the tractor frame and the distance B is relatively increased from the distance A. Thus the danger exists that the plow would scalp and dig at too deep a depth so the compensating device becomes automatically operative. Therefore, it is desired to move the standards 25 in a clockwise direction so that the blade 30 is pitched more in an upward direction. This is accomplished as follows: as the dimension or distance B is greater during this condition the angularity of the implement frame with respect to the tractor is such that the lever 57 is pivoted on the pivot point 58 causing the rod 49 to move inwardly toward the fluid jack 47 forcing fluid through the conduit 70 to the line 68' and to the first cylinders 35 which causes outward movement of the piston rod 37, thus causing the clockwise movement of the standards 25 to the desired position.

Supposing now the condition in FIG. 10 occurs wherein the implement frame angularity with respect to the tractor frame is such that the distance is decreased, in this case the lever 57 forces the piston rod 54 toward the fluid jack 52 whereupon fluid is forced from the said jack through the conduit 71 to the conduit 69' and to the fluid jacks 41 where again counterclockwise movement takes place and the plow blade 30 is pitched or tilted so that a deeper digging action takes place to compensate for the ravine or valley contour.

Thus the compensating device is responsive to any hilly, or ravine, type of contour and automatic adjustment of the pitch or tilt of the blade takes place so that in all instances the correct digging depth is maintained.

In the modification shown in FIG. 7 the linkage arrangement afforded by arms 84, 85 and 88 provides for the automatic adjustment. As the frame of the implement moves angularly with respect to the frame of the tractor the distance from the point 86 to the point 90 may be increased or decreased in the same manner as the distance from the pivotal point 58 and the pivotal point 64, as shown in FIG. 4, is increased or decreased. Thus as the dimension increases the lever 85 is moved to force the links or arms 84 rearwardly to tilt the standards 25 in a more upward direction. Conversely, when the implement frame moves closer to the tractor frame in the condition shown in FIG. 10, the lever arm 85 is pivoted in such a manner that the arm 87 moves the standards 25 in a counterclockwise direction. Thus by the simple linkage arrangement shown an automatic compensation action results.

The present construction shown also includes the U-shaped blade of FIG. 5 which is designed to direct the cut vegetation toward the center of the cutting edge thus preventing the clogging of the standards 25 which in many instances, in conventional plows, become so clogged that the plow is inoperative until the cut vegetation is removed.

It is now obvious that an improved root plow construction has been disclosed. It must be understood that changes and modifications may be made without departing from the spirit of the invention as disclosed or from the scope thereof as defined in the appended claim.

What is claimed is:

A pitch compensating means for adjusting the pitch of a tool pivotally mounted on an implement being towed by a tractor in response to relative movement between the implement and the tractor comprising first cylinder means capable of confining a fluid mounted on the implement, first piston means having first and second working faces reciprocably retained within said first cylinder means, first connecting means attaching said first piston means to the tool for pivoting the same relative to the implement, second cylinder means including a pair of fluid cylinders capable of confining a fluid mounted on either the implement or the tractor, second piston means including a pair of pistons one in each of said last mentioned fluid cylinders each piston having third and fourth working faces reciprocably retained within said second cylinder means, second connecting means including an arm attached to said second piston means and an adjustable link operably connected to the other of the implement or the tractor for reciprocating said pistons of said second piston means in opposite directions in response to relative movement of the implement and the tractor, the areas of said first and third working faces being equal to the areas of said second and fourth working faces respectively, a first conduit communicating with said first cylinder means for admitting fluid to said first working face and with said second cylinder means for admitting fluid to said third working face, and a second conduit communicating with said first cylinder means for admitting fluid to said second working face and with said second cylinder means for admitting fluid to said fourth working face, said cylinder means and said conduits forming a slave fluid system whereby movement by the implement relative to the tractor will cause said second connecting means to shift said second piston means thereby causing fluid flow from the second cylinder means to the first cylinder means to shift said first piston means to adjust the pitch of the tool.

References Cited by the Examiner

UNITED STATES PATENTS

| | | | |
|---|---|---|---|
| 1,894,516 | 1/33 | Karstedt | 172—698 X |
| 2,190,347 | 2/40 | Austin | 172—698 X |
| 2,782,703 | 2/57 | Chambers et al. | 172—239 |
| 2,887,166 | 5/59 | Vogelaar | 172—9 |
| 2,924,285 | 2/60 | Du Shane et al. | 172—4 |

FOREIGN PATENTS

| | | |
|---|---|---|
| 446,065 | 1/48 | Canada. |
| 1,168,639 | 9/58 | France. |

ANTONIO F. GUIDA, *Acting Primary Examiner.*

A. JOSEPH GOLDBERG, ARNOLD RUEGG,
*Examiners.*